No. 638,216. Patented Dec. 5, 1899.
J. S. COPELAND.
GEAR CUTTING MACHINE.
(Application filed Apr. 12, 1899.)

(No Model.) 3 Sheets—Sheet 1.

Witnesses:
Henrietta Lyon.
A. N. Jesbera.

Inventor:
James S. Copeland
by Redding, Kiddle & Greeley
Attys.

THE NORRIS PETERS CO., PHOTO-LITHO., WASHINGTON, D. C.

No. 638,216. Patented Dec. 5, 1899.
J. S. COPELAND.
GEAR CUTTING MACHINE.
(Application filed Apr. 12, 1899.)

(No Model.) 3 Sheets—Sheet 2.

Witnesses:
Henrietta Lyon
A. N. Jesbera

Inventor:
James S. Copeland
by Redding, Kiddle & Greeley
Atty's

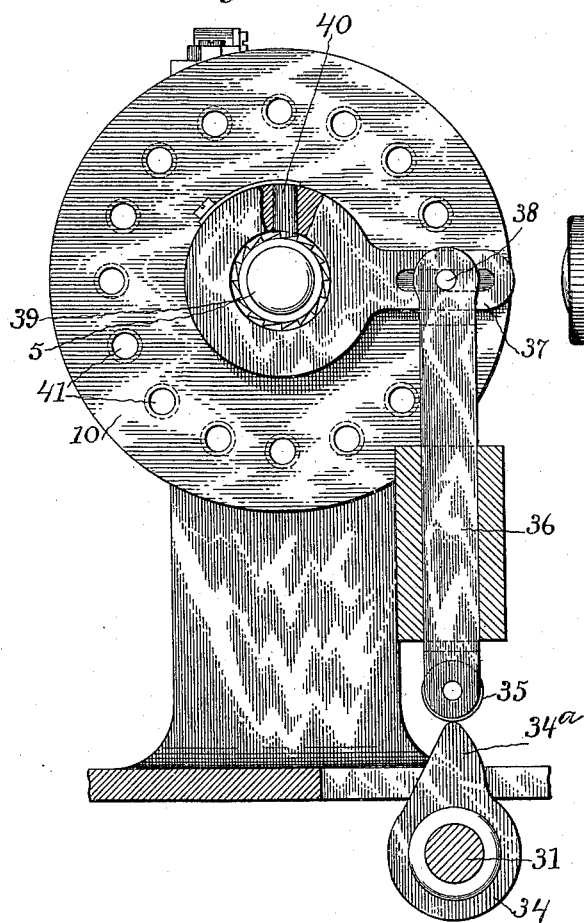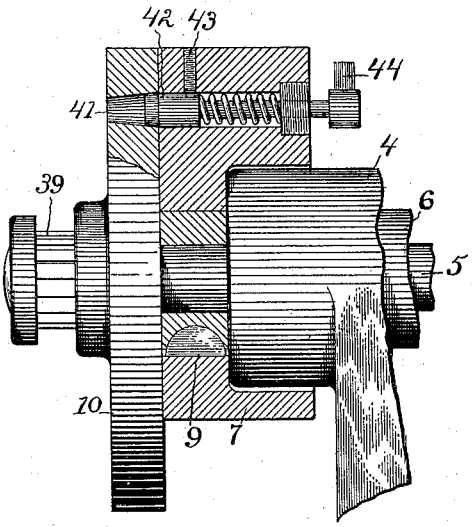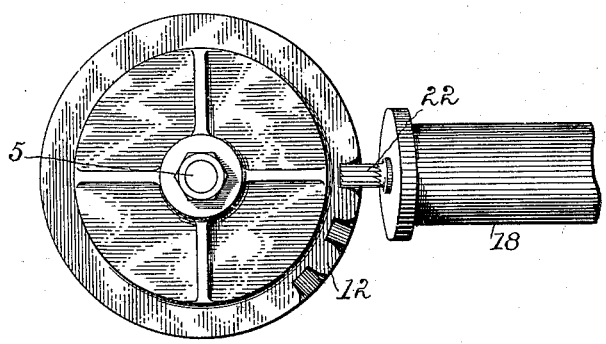

UNITED STATES PATENT OFFICE.

JAMES S. COPELAND, OF HARTFORD, CONNECTICUT, ASSIGNOR TO THE POPE MANUFACTURING COMPANY, OF SAME PLACE AND PORTLAND, MAINE.

GEAR-CUTTING MACHINE.

SPECIFICATION forming part of Letters Patent No. 638,216, dated December 5, 1899.

Application filed April 12, 1899. Serial No. 712,689. (No model.)

*To all whom it may concern:*

Be it known that I, JAMES S. COPELAND, a citizen of the United States, and a resident of the city and county of Hartford, State of Connecticut, have invented certain new and useful Improvements in Gear-Cutting Machines, of which the following is a full, clear, and exact description, whereby any one skilled in the art can make and use the same.

My invention relates to the class of gear-cutting machines in which the teeth of gears are cut or formed by moving elements which simulate the movement of interengaged teeth of the gears in actual operation as part of moving mechanisms; and the object of my invention is to provide a machine of this class which shall be more especially adapted to cut that class of gear-teeth which are used in connection with a "pin-gear," so called, or a gear in which one of the interengaging pair has teeth formed in the shape of projecting pins and known either as a "pin-gear" or "lantern-gear," with the object of obtaining greatest possible uniformity of teeth cut, which I do by minimizing the number of cutters used.

To this end my invention consists in the combination of the several parts making up the gear-cutting machine as a whole and in the combination of the parts, as hereinafter described, and more particularly pointed out in the claims.

Figure 1:
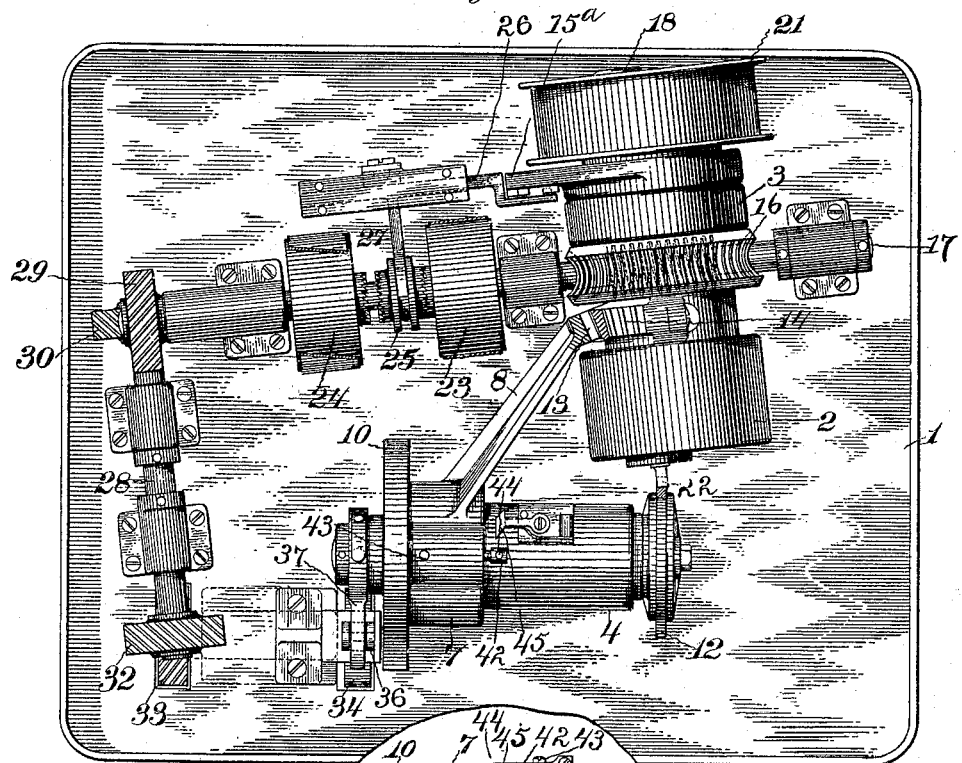
Figure 2:
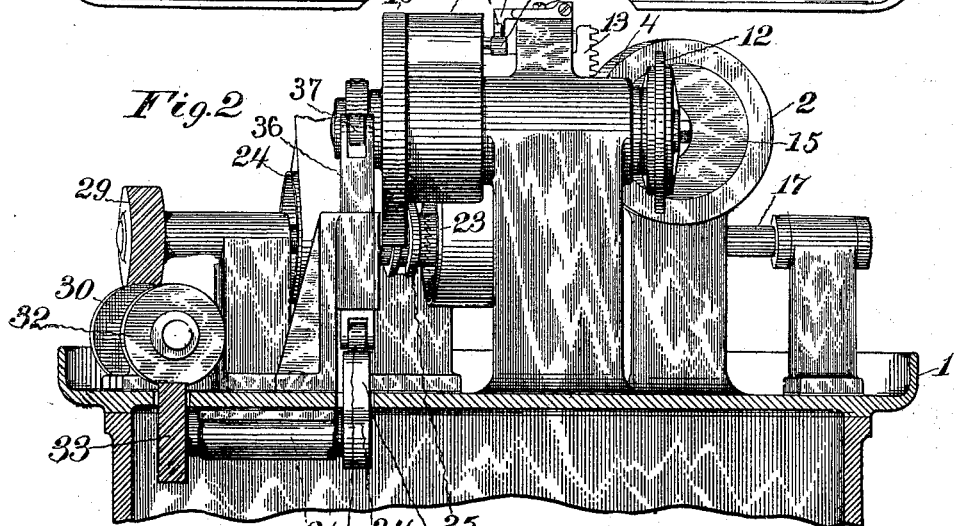
Figure 3:
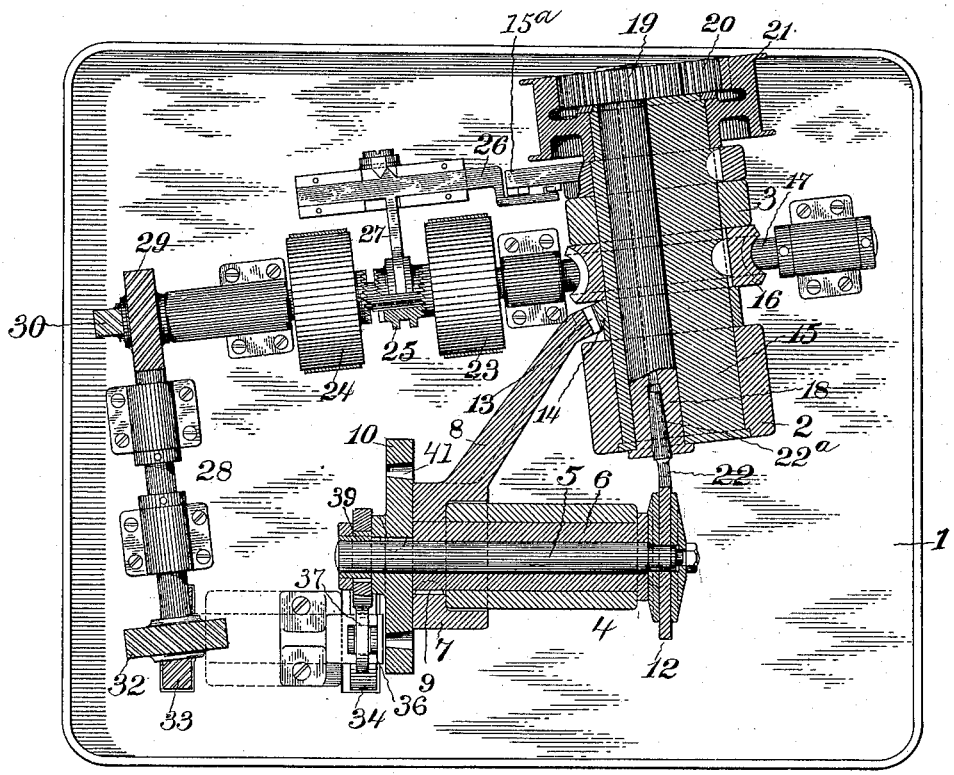
Figure 4:
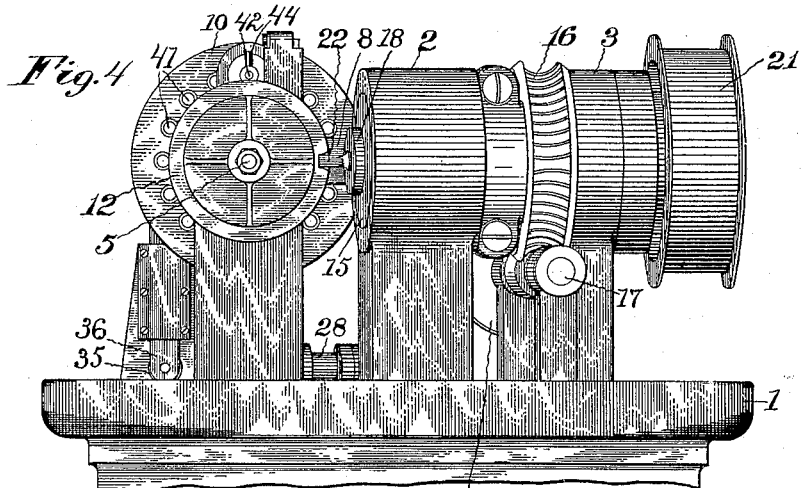

Referring to the drawings, Figure 1 is a plan view of my improved machine. Fig. 2 is a view in front elevation of the machine. Fig. 3 is a plan view of the bed of the machine, showing some parts in horizontal section to disclose the construction. Fig. 4 is a view in elevation of the machine, looking from the right, as shown in Fig. 1. Fig. 5 is a detail view, on enlarged scale, showing details of the indexing mechanism. Fig. 6 is a detail view, on enlarged scale, showing parts of the indexing mechanism in section. Fig. 7 is a detail view, on enlarged scale, illustrating the operation of the cutter in forming the gear. Fig. 8 is an edge view of a blank, showing the spaces between the teeth as formed by the cutter. Fig. 9 is a detail view showing the manner of gearing up the cutter-driving mechanism.

In the accompanying drawings the several main parts of the machine are shown as mounted in a horizontal position on a suitable bed 1, and in this form the bearings 2 3 support the cutter-operating mechanism and the bearing 4 supports a work-holding shaft 5. This shaft 5 is mounted within a sleeve 6, which has a shoulder at one end in contact with the end of the bearing 4 and projects beyond the bearing at the other end, where the hub 7 of the arm 8 is attached to the sleeve, as by means of a key 9, so that a rotary movement imparted to the hub 7 is communicated to the sleeve. Against the outer surface of the hub 7 an index-plate 10 is located, this plate being keyed to the shaft 5, so that a rotary movement imparted to the plate will be communicated to the work-holding shaft 5.

On the front end of the shaft 5 a clamp is provided for holding a blank 12, and this clamp is of any desired form. The outer end of the arm 8 is provided with a curved rack 13, the teeth of which are in mesh with a segmental gear 14, which is secured to the rotary cutter-carrier 15 mounted in the bearings 2 3. This cutter-carrier is rotated by means of the worm-gear 16, fast to the carrier and in mesh with a worm on the driving-shaft 17.

A rotary cutter-spindle 18 is eccentrically mounted in the carrier 15, with a gear 19, fast to the spindle, in mesh with the internal gear 20, fast to or formed on the inner face of the pulley 21. This pulley is driven from any suitable source of power and through the medium of the intermeshing gear-wheels 19 and 20 drives the cutter 22, which is firmly secured in the front end of the cutter-spindle. This construction of cutter and cutter-spindle provides an extremely firm bearing for the cutter, which will effectually withstand severe usage necessitated in this class of machines and this by reason of the large diameter of the cutter-spindle as compared with the diameter of the cutter.

On the driving-shaft 17 two pulleys 23 and 24 are loosely mounted, and they are driven in opposite directions by belts from a countershaft. A clutch member 25, keyed to the driving-shaft 17, has the usual sliding movement between the clutch member fast to the opposite pulleys, and this movement is imparted automatically by the slide 26, a forked arm 27, projecting from the slide, engaging a peripheral groove in the clutch member. The slide 26 is moved by the arm 15ª, fast to and turning with the carrier 15, the arm having suitable cams for engaging a pin on the arm of the slide held in the path of movement of the cams.

The shaft 17 drives a cross-shaft 28 through the medium of intermeshing gears 29 and 30, and this in turn drives the cam-shaft 31 through the intermeshing gears 32 and 33. The cam 34 on the cam-shaft 31 actuates the index-plate 10. A roller 35 on the lower end of a reciprocating plunger 36 rests on the cam, and the upper end of the plunger is connected to the slotted arm of a lever 37 by means of a pin 38, extending into the slot in the lever. The hub of the lever is mounted on a ratchet-wheel 39 and carries a spring-pawl 40, which is arranged to engage the teeth of the ratchet which is fast to the shaft 5. The downward movement of the plunger 36 causes the pawl of the ratchet device to move back along the ratchet-teeth, and a reverse or upward movement of the plunger causes the shaft 5 to be turned. The index-plate has a series of sockets 41, and an index-bolt 42, mounted in a socket in the hub 7 of the arm 8, is adapted to engage the sockets 41. The index-bolt is held against rotation, as by means of a screw 43, extending through the hub and into a slot in the bolt, as shown in Fig. 6, and the rear end of the bolt extending from the hub bears a pin 44, located in the path of movement of a cam 45, mounted on the bearing 4. The index-bolt is held at the forward limit of its play by means of a spring located in the socket in the usual manner.

The cutter 22 has a shank 22ª, fitting a socket in the end of the cutter-spindle 18. The cutter-spindle oscillates in a circular path owing to its eccentric position in the rotary carrier 15, and the cutter is driven at the same time at cutting speed.

The blank 12 is clamped on the shaft 5 and rocks slowly at a speed timed with reference to the oscillatory movement of the cutter-spindle, and as the latter passes across the periphery of the blank a cut is made in the edge of the blank presented to the cutter in form, size, and position corresponding to a space between adjacent teeth of a gear, which will mesh with a pin of a gear corresponding with the cutter used.

When the machine is in position to begin the operation of cutting a space in a blank, the cutter 22 is out of contact with the blank 12 and at one end of its oscillatory path and the index-plate is locked to the hub of the arm 8, so that as the connected mechanisms are caused to operate the cutter moves into cutting contact with the blank by the movement of the carrier 15 imparted to it by the driving-shaft 17 through the medium of the worm and worm-gear 16 when the clutch 25 is in engagement with the pulley 23. At the same time the arm 8, locked to the index-plate, which is fast to the shaft 5, is rocked by the segmental gear 14 in mesh with the rack 13 on the arm 8 and a slow rocking movement imparted to the blank while the cutter is operating to form a space between two teeth on the blank. After the cutter has swung clear of the blank 12 the arm 15ª on the carrier engages the shifter-slide 26 and reverses the motion of the shaft 17 by engaging the clutch 25 with the pulley 24. This reverses the feed motion, thus rocking both the carrier and blank-holder back to an initial position, when the cutter is then clear of the blank 12. At this time the pin 44 on the projecting end of the index-bolt 42 engages the trip-cam on the bearing 4 and unlocks the index-plate. If desired, the mechanism may be arranged to index after each series of movements, each series of which may consist of any predetermined number of movements of the cutter-carrier. During the cutting operation the cam 34 has been moved by the described mechanism until the projecting part 34ª strikes the roll on the plunger and lifts the latter, which moves the lever 37 and causes the index-plate to move, thereby timing the shaft 5 and the blank 12 one step in their intermittent movement of indexing. When the index-plate is locked in its new position and the blank turned to present an uncut part of its surface to the cutter, the clutch member 25 is operated by the means described to reverse the direction of rotation of the driving-shaft 17, and this causes the cutter to make a return oscillation in a path to again bring the cutter into cutting contact with the blank 12 and shapes another tooth. The rocking movement of the blank is of course also reversed in direction to correspond to the reverse movement of the cutter in its oscillation.

By the use of a single cutter, as described, or even if a few cutters were used, each space being cut by the identical tool, a much more uniform product is obtained than where there is a cutter representing each pin or tooth of the gear to mesh with the gear to be cut, as each additional cutter increases the uncertainty of uniform spaces in the resulting product.

I claim as my invention—

1. In combination in a gear-cutting machine, a cylindrical milling-cutter supported within a spindle, the spindle eccentrically mounted with respect to the axis of a cutter-carrier and rotatable independently of the cutter-carrier, the cutter-carrier partially rotatable about an axis substantially parallel with the axis of the cutter-spindle, a blank-holder rotatable in a fixed ratio with the rotation of the cutter-carrier, means to effect and control dependent rocking movement of the blank-holder and cutter-carrier, and means for driving said cutter.

2. In combination in a gear-cutting machine, a cylindrical milling-cutter supported within a spindle, the spindle of larger diameter of bearing-surface than the cutter and eccentrically mounted with respect to the axis of the cutter-carrier and rotatable independently of said carrier, the cutter-carrier partially rotatable about an axis substantially parallel with the axis of the cutter-spindle, a blank-holder rotatable in a fixed ratio with the rotation of the cutter-carrier, means to effect and control dependent rocking movement of the blank-holder and cutter-carrier, and means for driving said cutter.

3. In combination in a gear-cutting machine, a cylindrical milling-cutter supported within a spindle, the spindle eccentrically mounted with respect to the axis of a cutter-carrier and rotatable independently of said carrier, the cutter-carrier partially rotatable, a blank-holder rotatable in a fixed ratio with the rotation of the cutter-carrier, means to effect and control dependent rocking movement of the blank-holder and cutter-carrier, means for driving said cutter, an indexing mechanism to change the relative position of a point on the periphery of the blank-holder and the cutter, and means for effecting such change by means dependent upon the rocking mechanism of said carrier or blank-holder.

4. In combination in a gear-cutting machine, a cylindrical milling-cutter supported within a spindle, the spindle eccentrically mounted with respect to the axis of a cutter-carrier and rotatable independently of said carrier, the cutter-carrier partially rotatable about an axis substantially parallel with the axis of the cutter-spindle, a blank-holder having its axis arranged at an angle with the axis of the cutter and rotatable in a fixed ratio with the rotation of the cutter-carrier, means to effect and control dependent rocking movement of the blank-holder and cutter-carrier, and means for driving said cutter.

5. In combination in a gear-cutting machine, a milling-cutter having a straight elemented cutting-surface and supported within a spindle, the spindle eccentrically mounted with respect to the axis of a cutter-carrier and rotatable independently of said carrier, the cutter-carrier partially rotatable about an axis substantially parallel with the axis of the cutter-spindle, a blank-holder having its axis arranged at an angle with the axis of the cutter and rotatable in a fixed ratio with the rotation of the cutter-carrier, means to effect and control dependent rocking movement of the blank-holder and cutter-carrier, and means for driving said cutter.

6. In combination in a gear-cutting machine, a cylindrical milling-cutter supported within a spindle rotatable in bearings within a cutter-carrier, the spindle eccentrically mounted with respect to the axis of a cutter-carrier and rotatable independently of said carrier, the cutter-carrier partially rotatable about an axis substantially parallel with the axis of the cutter-spindle, a blank-holder rotatable in a fixed ratio with the rotation of the cutter-carrier, means to effect and control dependent rocking movement of the blank-holder and cutter-carrier, and means for driving said cutter.

7. In combination in a gear-cutting machine, a cylindrical milling-cutter supported within a spindle, the spindle eccentrically mounted with respect to the axis of a cutter-carrier and rotatable independently of said carrier, the cutter-carrier partially rotatable about an axis substantially parallel with the axis of the cutter-spindle, a blank-holder rotatable about an axis in a fixed ratio with the rotation of the cutter-carrier, means to effect and control dependent rocking movement of the blank-holder and cutter-carrier, means for driving said cutter, and means for stopping the rocking feeding movement of the blank-holder and cutter-carrier in one direction when the milling-cutter has swung clear of the blank.

JAMES S. COPELAND.

Witnesses:
BRAYTON S. LEWIS,
HERMANN F. CUNTZ.